(12) United States Patent
Baccouche et al.

(10) Patent No.: US 9,481,395 B2
(45) Date of Patent: Nov. 1, 2016

(54) COLLISION DEFLECTOR ASSEMBLY

(71) Applicant: Ford Global Technologies, LLC, Dearborn, MI (US)

(72) Inventors: Ridha Baccouche, Ann Arbor, MI (US); Saeed David Barbat, Novi, MI (US); Jamel E. Belwafa, Ann Arbor, MI (US); Rahul Arora, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/721,371

(22) Filed: May 26, 2015

(65) Prior Publication Data

US 2015/0259009 A1 Sep. 17, 2015

Related U.S. Application Data

(62) Division of application No. 13/944,392, filed on Jul. 17, 2013, now Pat. No. 9,067,549.

(51) Int. Cl.
| | | |
|---|---|---|
| B60J 7/00 | (2006.01) | |
| B62D 21/15 | (2006.01) | |
| B62D 25/08 | (2006.01) | |
| B60R 19/34 | (2006.01) | |
| B60R 19/14 | (2006.01) | |
| B60R 19/16 | (2006.01) | |
| B60R 19/18 | (2006.01) | |
| B60R 21/00 | (2006.01) | |

(52) U.S. Cl.
CPC ............ *B62D 21/152* (2013.01); *B60R 19/14* (2013.01); *B60R 19/16* (2013.01); *B60R 19/34* (2013.01); *B62D 25/082* (2013.01); *B60R 2019/1813* (2013.01); *B60R 2021/0023* (2013.01)

(58) Field of Classification Search
CPC .. B62D 21/152; B62D 25/082; B60R 19/34; B60R 19/16; B60R 2021/0023; A63B 2049/0211; A63B 49/02; A63B 49/03; B01D 33/067; B01D 33/11
USPC ............... 296/187.09, 187.03; 180/271, 274; 293/132, 133
See application file for complete search history.

(56) References Cited

U.S. PATENT DOCUMENTS

| | | | | |
|---|---|---|---|---|
| 3,578,358 | A | * 5/1971 | Reynolds | ............... B60D 1/01 280/495 |
| 3,738,696 | A | * 6/1973 | McLauchlan | ......... B60R 19/285 293/133 |
| 4,514,002 | A | * 4/1985 | McIntosh | ................ B60R 19/56 293/118 |
| 5,275,436 | A | 1/1994 | Pomero | |
| 6,286,867 | B1 | * 9/2001 | Braemig | ................ B60R 19/00 280/762 |
| 6,364,358 | B1 | * 4/2002 | Miller | .................... B62D 25/04 280/784 |

(Continued)

*Primary Examiner* — Kiran B Patel
(74) *Attorney, Agent, or Firm* — Jason Rogers; Price Heneveld LLP

(57) ABSTRACT

A vehicle frame is provided having a frame. The frame includes a main rail and a lateral rail. A bracket is operably coupled to the main rail. The vehicle frame assembly also includes a wedged shape deflecting member. The wedged shape deflecting member has a first end which is operably coupled to the bracket and a second end which is operable between a standard use position and a collision event position. The standard use position is where the second end is spaced a predetermined distance from the main rail. The collision event position is when the second end is in abutting contact with the main rail. During a collision event, the second end moves from the standard use position to the collision event position such that the deflecting member absorbs and deflects energy imparted on the frame.

6 Claims, 4 Drawing Sheets

(56) References Cited

U.S. PATENT DOCUMENTS

| | | |
|---|---|---|
| 6,957,846 B2 | 10/2005 | Saeki |
| 7,523,979 B2 | 4/2009 | Jeong |
| 7,802,839 B2 | 9/2010 | Ajisaka |
| 7,819,218 B2 | 10/2010 | Eichberger et al. |
| 7,926,847 B2 * | 4/2011 | Auer .................. B60R 19/54 280/784 |
| 8,336,933 B2 | 12/2012 | Nagwanshi et al. |
| 8,353,380 B2 | 1/2013 | Schonberger et al. |
| 8,398,153 B1 * | 3/2013 | Dandekar ............ B62D 21/152 296/187.09 |
| 8,398,154 B1 | 3/2013 | Nusier et al. |
| 8,469,442 B1 * | 6/2013 | Pencak ................ B62D 25/14 296/187.12 |
| 8,480,130 B2 * | 7/2013 | Dandekar ............ B62D 21/11 280/784 |
| 8,602,454 B1 * | 12/2013 | Baccouche ............ B60K 1/04 180/68.5 |
| 8,608,231 B1 * | 12/2013 | Mendivil ............. B60R 19/34 293/133 |
| 8,662,566 B1 * | 3/2014 | Edwards ............. B60R 19/24 293/133 |
| 8,733,823 B2 | 5/2014 | Brockhoff et al. |
| 8,764,096 B2 * | 7/2014 | Han ................... B60R 19/18 296/133 |
| 8,807,632 B2 * | 8/2014 | Ramoutar ............ B60R 19/24 293/132 |
| 8,857,902 B2 * | 10/2014 | Sekiguchi ........... B62D 25/082 296/187.09 |
| 8,882,184 B2 * | 11/2014 | Naito ................. B62D 25/082 296/203.02 |
| 8,888,168 B2 * | 11/2014 | Kuwabara ........... B62D 25/082 296/187.09 |
| 8,939,480 B1 * | 1/2015 | Barbat ................. B60R 19/34 293/133 |
| 9,061,713 B2 * | 6/2015 | Hashimoto ......... B62D 21/152 |
| 9,156,418 B2 * | 10/2015 | Ramoutar ............ B60R 19/24 |
| 9,233,715 B1 * | 1/2016 | Ramoutar ........... B62D 25/082 |
| 9,248,865 B2 * | 2/2016 | Hisazumi ........... B62D 25/082 |
| 9,352,711 B2 * | 5/2016 | Hoiss ................. B62D 21/152 |
| 2008/0023954 A1 * | 1/2008 | Eichberger ........... B60R 19/00 280/784 |
| 2009/0160203 A1 * | 6/2009 | Garg ................... B60R 19/12 293/120 |
| 2012/0248820 A1 * | 10/2012 | Yasui .................. B60R 19/34 296/187.09 |
| 2012/0313398 A1 | 12/2012 | Shin et al. |
| 2013/0234456 A1 * | 9/2013 | Brockhoff ............ B60R 19/34 293/133 |
| 2015/0021936 A1 * | 1/2015 | Nusier ................ B62D 21/152 293/114 |
| 2015/0048636 A1 * | 2/2015 | Barbat ................. B60R 19/34 293/133 |

* cited by examiner

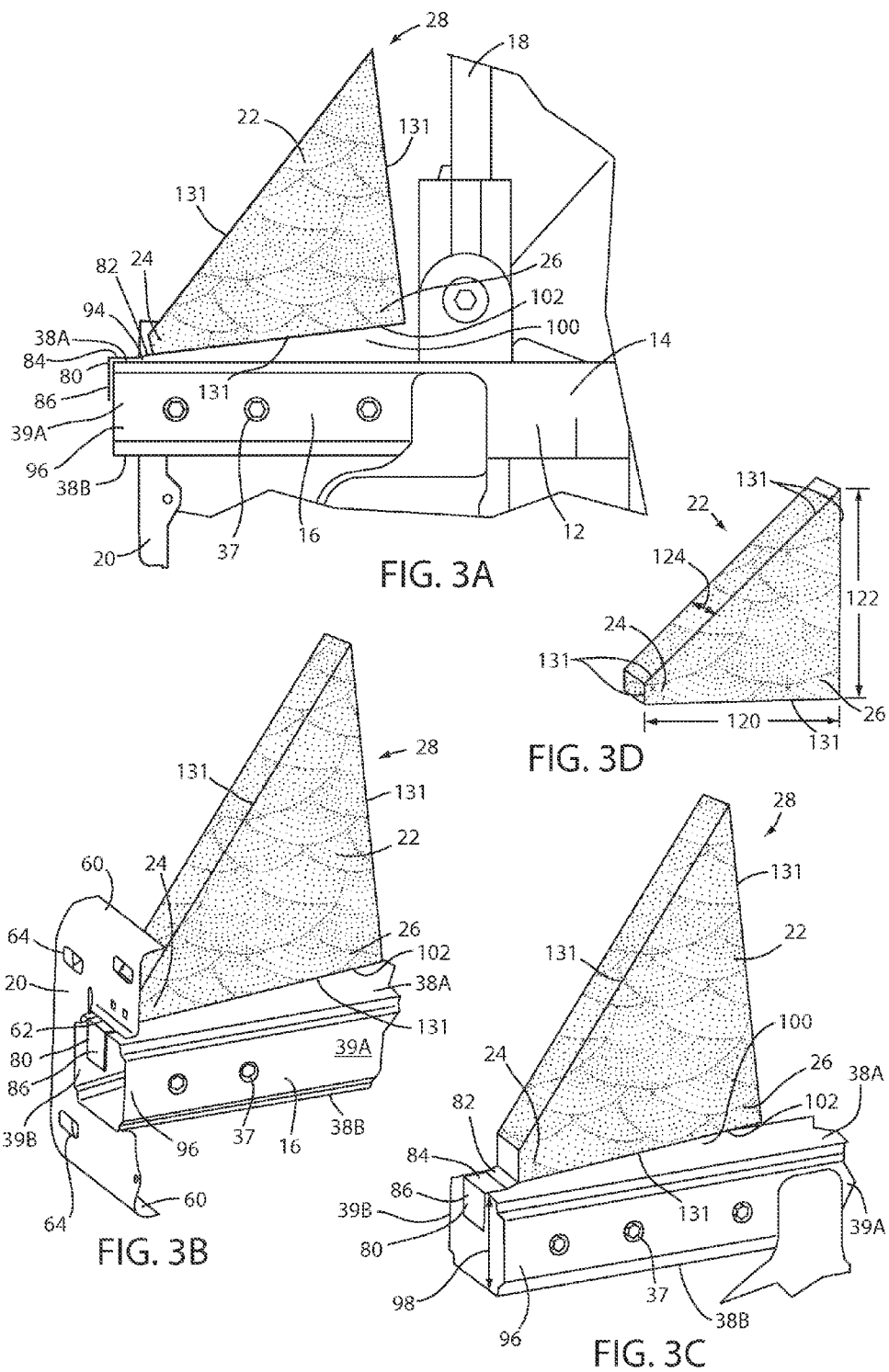

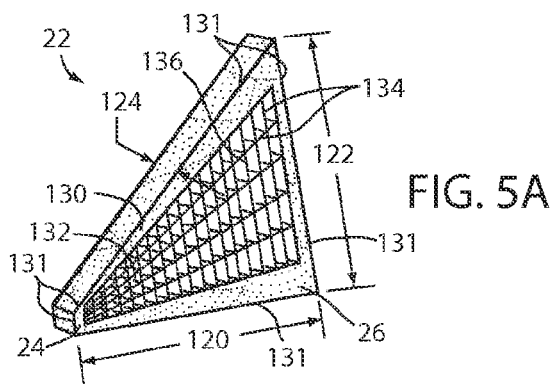
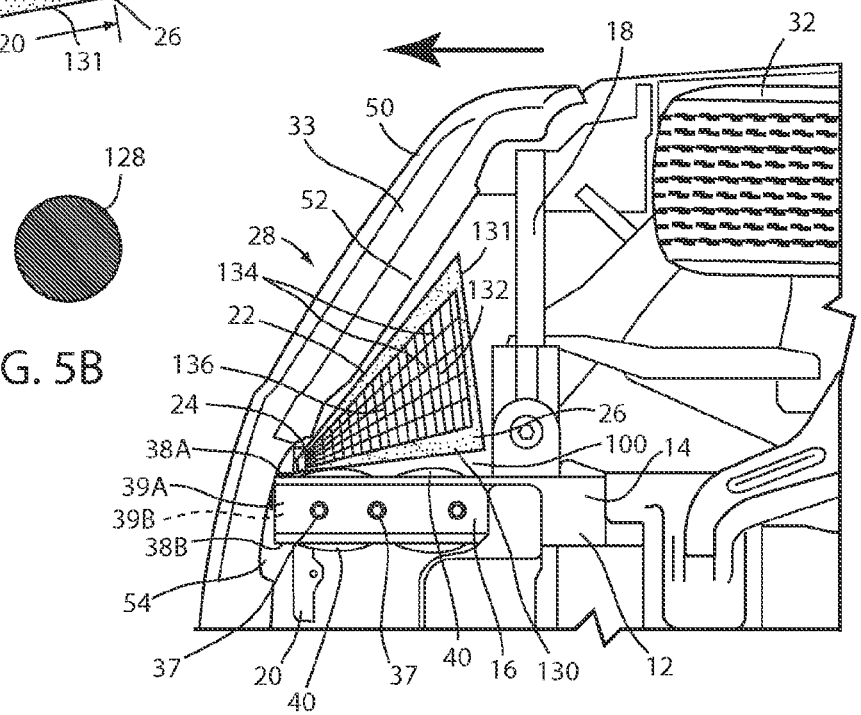
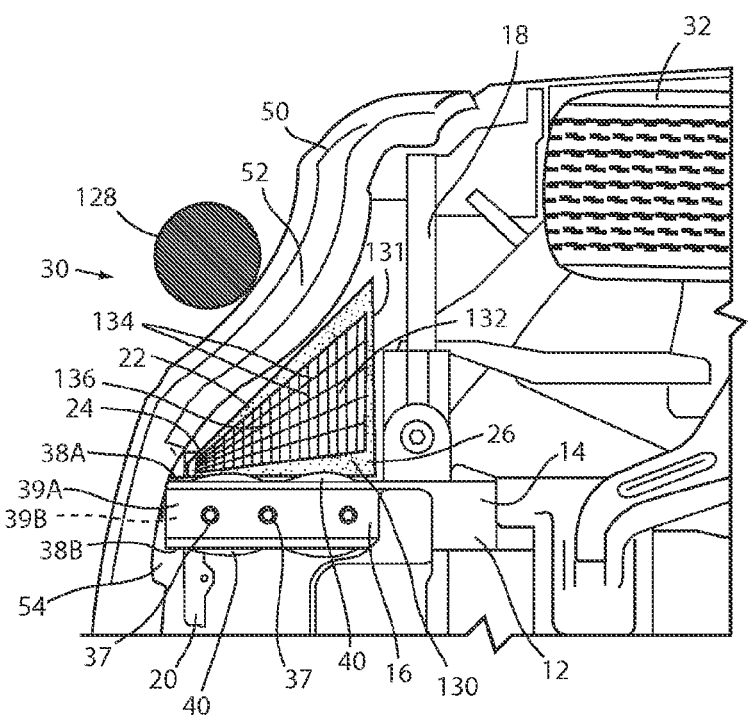

COLLISION DEFLECTOR ASSEMBLY

CROSS-REFERENCE TO RELATED APPLICATION

This application is a divisional of and claims priority to U.S. patent application Ser. No. 13/944,392 filed on Jul. 17, 2013, entitled "COLLISION DEFLECTOR ASSEMBLY," the entire disclosure of which is hereby incorporated herein by reference.

FIELD OF THE INVENTION

The present invention generally relates to a vehicle frame assembly, and more particularly to a vehicle frame having a deflector for lateral vehicle deflection during a frontal collision event.

BACKGROUND OF THE INVENTION

Vehicles that include improved yet light weight collision technology increase value and safety to the consumer.

SUMMARY OF THE INVENTION

According to one aspect of the present invention, a vehicle frame assembly includes a frame with a main rail and a lateral rail. A bracket is operably coupled to the main rail. The vehicle frame assembly also includes a wedged shape deflecting member. The wedged shape deflecting member has a first end which is operably coupled to the bracket and a second end which is operable between a standard use position and a collision event position. In the standard use position, the second end is spaced a predetermined distance from the main rail. In the collision event position, the second end is in abutting contact with the main rail. During a collision event, the second end moves from the standard use position to the collision event position such that the deflecting member absorbs and deflects energy imparted on the frame.

According to another aspect of the present invention, a vehicle frame assembly includes a frame having a main rail. A bracket is operably coupled to the main rail. The vehicle frame assembly also includes a wedge-shaped deflecting member which has a first end operably coupled to the bracket and a second end. The second end is operable between a standard use position where the second end is spaced a predetermined distance from the main rail, and a collision event position wherein the second end is in abutting contact with the main rail.

Yet another aspect of the present invention includes a frame assembly for a vehicle which includes a frame. A bracket is operably coupled to the frame and is proximate a front bumper of the vehicle. An angular deflecting member is also provided and includes a first end which is operably coupled to the bracket. The angular deflecting member also includes an interior side spaced a predetermined distance from the frame in normal use and configured to abut the frame during a collision event. A forward side of the angular deflecting member is configured to receive energy from the front bumper during a collision event.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3A is an enlarged partial bottom plan view of the deflecting member and frame of FIG. 2;

FIG. 3B is a bottom perspective view of one embodiment of the deflecting member according to one embodiment of the present invention;

FIG. 3C is a bottom perspective view of one embodiment of the deflecting member according to one embodiment of the present invention;

FIG. 3D is a bottom perspective view of one embodiment of the deflecting member of FIG. 3B removed from the frame;

FIG. 5A is a bottom perspective view of another embodiment of a deflecting member of the present invention;

FIG. 5B is a partial bottom plan view of the deflecting member of FIG. 5A in a first position on the frame; and FIG. 5C is a partial bottom plan view of the deflecting member of FIG. 5A in a second position on the frame.

DETAILED DESCRIPTION OF THE EMBODIMENTS

Figure 1:
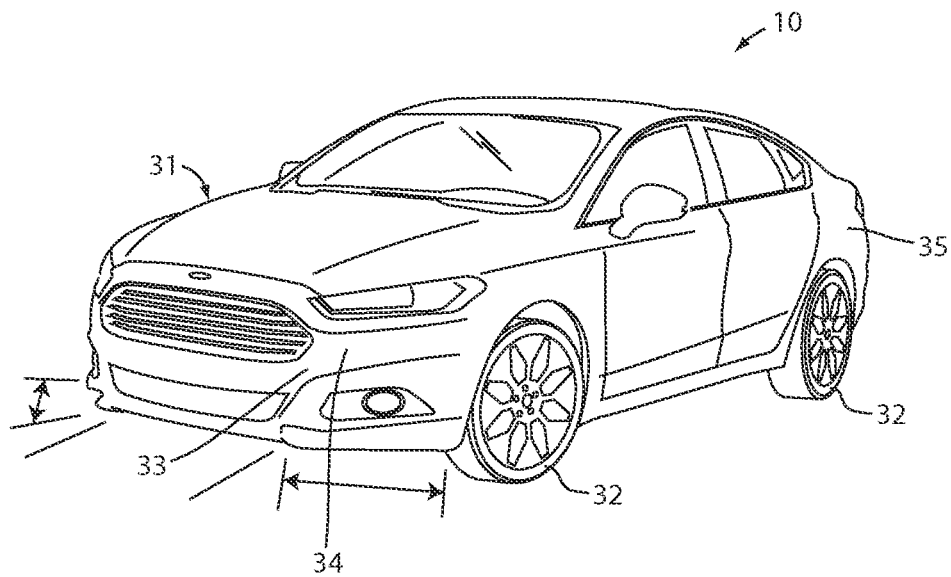
FIG. 1 is a front perspective view of a vehicle according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiments shown in FIGS. 1-3D, the reference numeral 10 generally designates a vehicle having a vehicle frame assembly 12. The vehicle frame assembly 12 includes a frame 14 having a main rail 16 and a lateral rail 18. A bracket 20 is operably coupled to the main rail 16. A wedge-shaped deflecting member 22 includes a first end 24 which is operably coupled to the bracket 20 and a second end 26 which is operable between a standard use position 28 and a collision event position 30 (see FIGS. 4B and 5C). In the standard use position 28, the second end 26 is spaced a predetermined distance from the main rail 16. In the collision event position 30, the second end 26 is in abutting contact with the main rail 16. During a collision event, the second end 26 moves from the standard use position 28 to the collision event position 30 such that the deflecting member 22 absorbs and deflects energy imparted on the frame 14.

Figure 2:
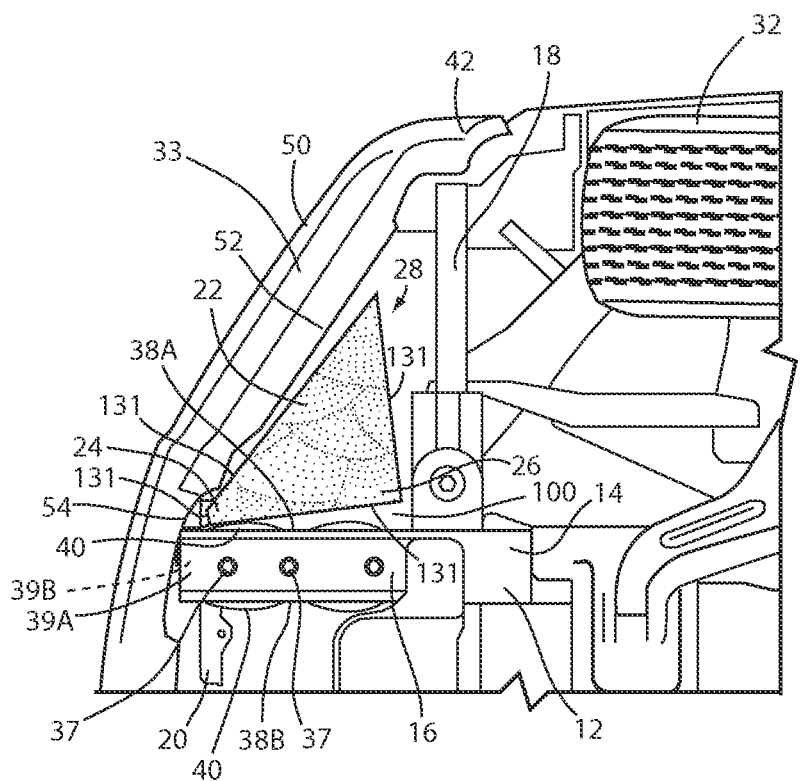
FIG. 2 is a partial bottom plan view of a frame of the vehicle having a deflecting member according to one embodiment of the present invention.

Referring again to FIG. 1, the vehicle 10 includes a vehicle body 31, multiple wheels 32, a bumper 33, a front end 34, and a rear end 35. The vehicle 10 may be of any type including a compact vehicle, a mid-size vehicle, a sport utility vehicle, a mini or full size van, or any type of truck. As illustrated in FIG. 2, the vehicle 10 is supported on the frame 14. The frame 14 is generally defined by the main rail 16, the lateral rail 18, and a plurality of secondary rails configured to support the vehicle body 31. The main rail 16 extends from the bumper 33 to the rear end 35 of the vehicle 10. In the illustrated embodiment, the main rail 16 has a square cross-section and is comprised of a strong steel material in order to support the weight of the vehicle 10. However, the main rail 16 may also have a variety of other configurations. The main rail 16 may also include a plurality of bolt holes 37 in order to attach a radiator, supporting brackets, or other elements to the main rail 16. The main rail 16 includes a top surface 38A, bottom surface 38B, first side surface 39A, and a second side surface 39B.

Referring again to the embodiment illustrated in FIG. 2, bumps 40 may be disposed on the first side surface 39A or the second side surface 39B of the main rail 16 and are configured to allow the main rail 16 to fold in accordion-like style during the frontal collision event. It is also contemplated that the main rail 16 may not include bumps 40 or may include non-rounded bumps such as square or triangular shaped bumps. The lateral rail 18 is disposed perpendicular to the main rail 16 and is also configured to support the vehicle body 31. The lateral rail 18 extends the entire width of the vehicle 10 and abuts a distal edge 42 of the bumper 33. The lateral rail 18 may also include any of the features as described above with respect to the main rail 16 including the square cross-section, composition of steel, bolt holes 37, bumps 40, etc. Moreover, the main rail 16 and the lateral rail 18 may have any cross-section configured or designed to support the vehicle body 31 including but not limited to a plus-shaped cross-section, triangular cross-section, a circular cross-section, and a trapezoidal cross-section. Additionally, the main rail 16 and the lateral rail 18 may be comprised of any material capable of providing support to the vehicle body 31 including but not limited to stainless steel, brushed steel, or a strong plastic polymer material.

As shown in the embodiment of FIG. 2, the bumper 33 is a dual layered bumper 33 having an outer layer 50 which is configured to be externally exposed and an inner layer 52 which provides a buffer between the outer layer 50 and the vehicle frame 14. The bumper 33 is generally comprised of a sturdy polymeric material. The inner layer 52 of the bumper 33 may also include one or more indents 54 in order to more closely receive portions of the frame 14 such as the main rail 16 or the lateral rail 18. The bumper 33 is configured to deform during the collision event in order to absorb some of the force from the collision event. The bumper 33 may also be comprised of a steel material or any other material as used by one of ordinary skill in the art. Moreover, the outer layer 50 of the bumper 33 has a material and color such that the outer layer 50 of the bumper 33 coordinates or blends in with the vehicle body 31. Additionally, a portion of the inner layer 52 of the bumper 33 may be in abutting contact with the first end 24 of the deflecting member 22.

Referring now to the embodiment shown in FIG. 2-3B, the connecting bracket or bracket 20 is disposed between the inner layer 52 of the bumper 33 and the main rail 16. The bracket 20 is operably coupled to the main rail 16. The bracket 20 is configured to support the main rail 16 and connect the bumper 33 to the main rail 16. The bracket 20 includes curved edges 60 and a receiving aperture 62 configured to closely receive the main rail 16. The bracket 20 is in abutting contact with and also operably coupled, generally using bolts, to the deflecting member 22. The bracket 20 may also include additional apertures 64 in order to lower the weight of the bracket 20 while still providing sufficient strength. The bracket 20 is typically comprised of a strong steel material in order to provide a secure connection between the bumper 33 and the main rail 16.

Referring now to the embodiments shown in FIGS. 2-3D, the deflecting member 22 is operably coupled to the bracket 20. The deflecting member 22 has a generally wedge-shaped construction. The deflecting member 22 also includes the first end 24 and the second end 26, with the second end 26 being the larger end of the wedge-shaped deflecting member 22. The deflecting member 22 may be comprised of a hollow steel shell. The steel shell may be reinforced with a thin foam layer or the deflecting member 22 may include only steel, a foam filled steel shell, or a similar alternative that provides a strong, yet light weight structure. The first end 24 of the deflecting member 22 is operably coupled to the bracket 20. At the same time, the bracket 20 is operably coupled to the main rail 16. The first end 24 of the deflecting member 22 may be connected to the bracket 20 by any mechanical fastening device such as bolts, screws, or other fasteners.

Referring now to the embodiment shown in FIGS. 3A-3C, the first end 24 of the deflecting member 22 also includes a connecting flange 80 which extends between the bracket 20 and the main rail 16. The connecting flange 80 is configured to provide additional attachment support for the first end 24 of the deflecting member 22. The connecting flange 80 has a first section 82, a second portion 84, and a third portion 86. The first section 82 is generally flat and rectangular in shape and is operably coupled to the first end 24 of the deflecting member 22. When the deflecting member 22 is in the standard use position 28, the first section 82 of the connecting flange 80 is spaced a predetermined distance away from the main rail 16 and defines a flange space 94. The first section 82 of the connecting flange 80 is disposed at an angle such that the first section 82 of the connecting flange 80 is connected to, and disposed between the first end 24 of the deflecting member 22 and the second portion 84 of the connecting flange 80. When the deflecting member 22 is in the collision event position 30 (see FIGS. 4B and 5C), the first section 82 of the connecting flange 80 is still disposed between the first end 24 of the deflecting member 22 and the second portion 84 of the connecting flange 80, however, the first section 82 of the connecting flange 80 is flat and in abutting contact with the main rail 16.

Referring again to the embodiment shown in FIG. 3B, the second portion 84 of the connecting flange 80 is operably coupled with and disposed between the first section 82 of the connecting flange 80 and the third portion 86 of the connecting flange 80 and is generally rectangular in shape. The second portion 84 of the connecting flange 80 extends at least until a distal end 96 of the main rail 16 and is in abutting contact with the main rail 16. The first section 82 and the second portion 84 of the connecting flange 80 are in abutting contact with the bracket 20 in order to provide additional support to the deflecting member 22. The third portion 86 of the connecting flange 80 is operably coupled to and perpendicular with the second portion 84 of the connecting flange 80. The third portion 86 of the connecting flange 80 generally extends at least a portion of a height 98 (as shown in FIG. 3C) of the main rail 16 in order to provide attachment support for the deflecting member 22. The third portion 86 of the connecting flange 80 may also be in abutting contact with the inner layer 52 of the bumper 33.

Again, the third portion 86 of the connecting flange 80 is flat and generally rectangular in shape.

As illustrated in FIGS. 3A-3C, the second end 26 of the deflecting member 22 is disposed adjacent to the lateral rail 18. The deflecting member 22 is configured to be in a first or standard use position 28 where the second end 26 of the deflecting member 22 is disposed away from the main rail 16 and in a second or collision event position 30 (see FIGS. 4B and 5C) when the second end 26 of the deflecting member 22 is in abutting contact with the main rail 16. When the deflecting member 22 is in the standard use position 28, as shown in FIGS. 2 and 3A-3C, the second end 26 of the deflecting member 22 is spaced the predetermined distance away from the main rail 16. Since the first end 24 of the deflecting member 22 is fixed to the main rail 16, in the standard use position 30, a triangular-like shaped space 100 is defined between the main rail 16 and the deflecting member 22. When the deflecting member 22 is in the collision event position 30 a side wall portion 102 which connects the first end 24 and the second end 26 is generally parallel with and in abutting contact with the main rail 16.

As shown in FIG. 3D, the deflecting member 22 has a length 120, a width 122, and a thickness 124. The length 120 of the deflecting member 22 is generally from about 7 inches to about 12 inches, and usually approximately 9 inches. The thickness 124 of the deflecting member 22 is generally from about 0.5 mm to about 3 mm, and usually approximately 1 mm. The widest part, located on the second end 26, of the deflecting member 22 generally has a width of 8 inches to 16 inches, and usually approximately 12 inches. These dimensions allow the deflecting member 22 to be disposed between the main rail 16, the lateral rail 18, and the inner layer 52 of the bumper 33 without causing interference to any other portion of the vehicle 10. Moreover, these dimensions and ranges may be larger or smaller based upon the type of vehicle 10 employing the deflecting member 22. Additionally, when the deflecting member 22 is comprised of foam, the foam has a structural yield of approximately 200 to 300 MPa, and usually a structural foam yield of approximately 256 MPa. When the deflecting member 22 is comprised of a strong steel shell reinforced with the foam layer, the weight of the steel shell and the foam structure is approximately 5 pounds to 6 pounds, usually approximately 5.5 pounds.

Figure 4A:
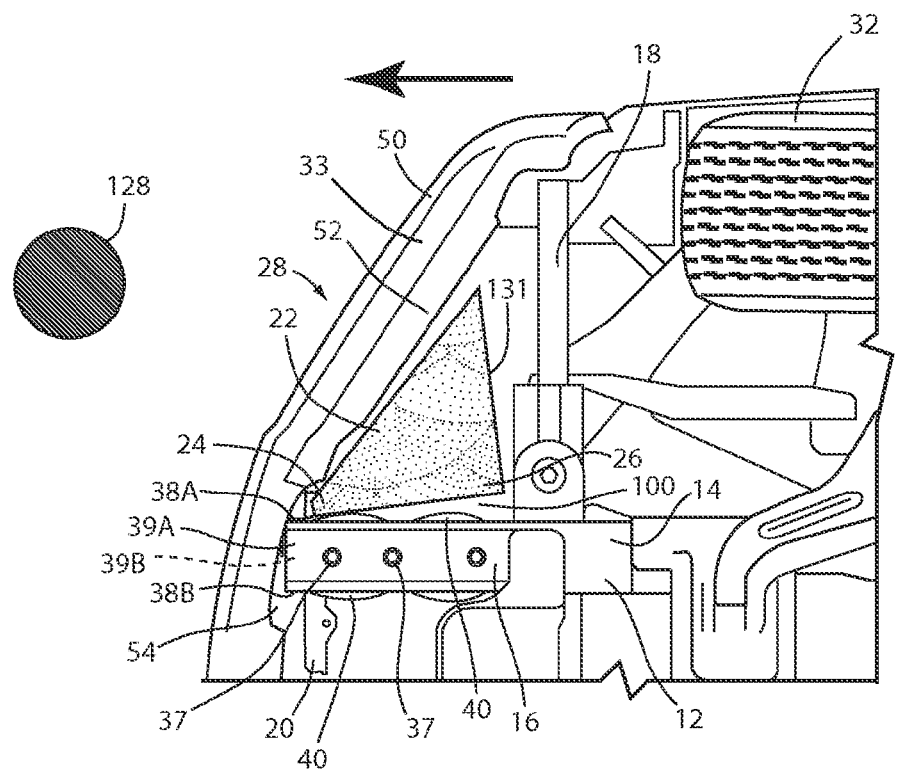
FIG. 4A is a partial bottom plan view of the deflecting member in a first position in the frame.
Figure 4B:
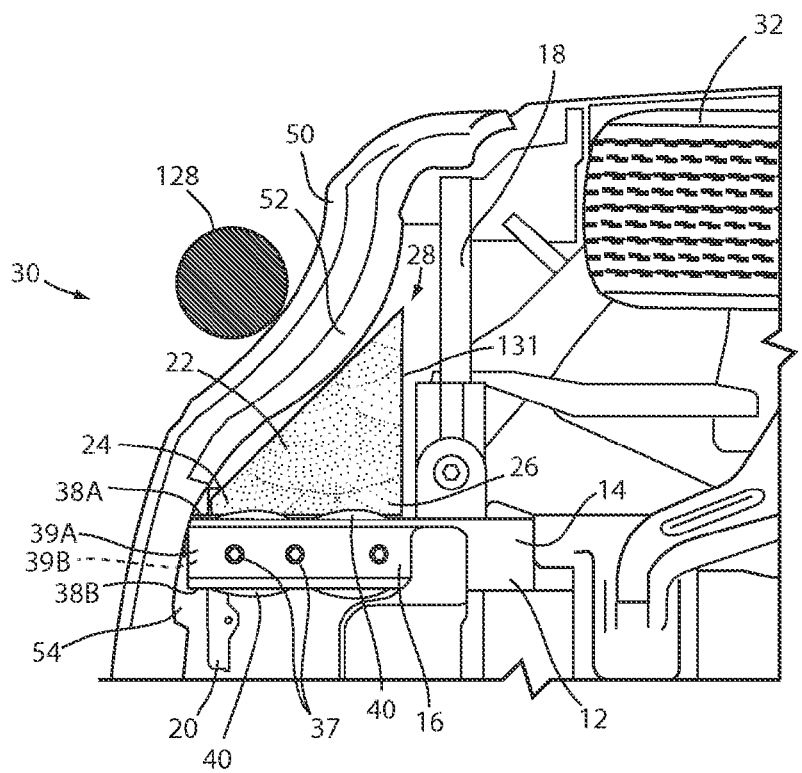
FIG. 4B is a partial bottom plan view of the deflecting member in a second position.

In operation, and as shown in FIGS. 4A and 4B, the deflecting member 22 begins in the standard use position 28 as the vehicle 10 is traveling in a generally forward direction. When the vehicle 10 has a frontal collision event with a rigid barrier 128, such as the small off-set rigid barrier which maybe, for example, a telephone pole, the bumper 33 is deformed, as shown in FIG. 4B, causing the deflecting member 22 to be pushed into the collision event position 30. The deflecting member 22 moves independently from the main rail 16. The deflecting member 22 is configured to deflect the vehicle 10 laterally upon impact with the rigid barrier 128. The deflecting member 22 also provides a uniform load distribution of the force from the frontal collision event to the main rail 16 which allows less deformation of the main rail 16 which results in less intrusion and deformation of the vehicle 10 during the frontal collision event. The deflecting member 22 is also configured to absorb energy from the frontal collision event resulting in less deformation and intrusion.

Referring now to the embodiment shown in FIGS. 5A-5C, the vehicle 10 may include many of the same features as described above including the main rail 16, the lateral rail 18, the bumper 33, the deflecting member 22, and the connecting bracket 20. However, the deflecting member 22 may also include an outer portion 130 extending around a perimeter 131 of the deflecting member 22, and an inner portion 132. The outer portion 130 being similar to the embodiment shown in FIGS. 2-4B where the deflecting member 22 is comprised of a steel shell having foam reinforcement or filling. However, in the embodiment illustrated in FIGS. 5A-5C, the inner portion 132 of the deflecting member 22 includes a plurality of ribs 134. In the illustrated embodiment, the ribs 134 are comprised of a plastic polymer. However, the ribs 134 may also be made of steel, foam, or other strong structural materials. The ribs 134 extend vertically and horizontally across the inner portion 132 of the deflecting member 22 forming a grid 136. The ribs 134 provide the deflecting member 22 with the desired stiffness while giving the deflecting member 22 a light weight structure.

Referring again to the embodiment shown in FIGS. 5A-5C, the deflecting member 22 may include many of the same features as described above with respect to the embodiments shown in FIGS. 3A-3D, including the width 122, length 120, and thickness 124 of the deflecting member 22. The ribs 134 of the deflecting member 22 generally have a plastic yield of approximately 65 to 80 MPa, and usually 73 MPa. The structural yield of the foam is approximately 200 to 300 MPa, and usually 256 MPa. Additionally, the weight of the deflecting member 22 is approximately 5 to 6 pounds and usually approximately 5.3 pounds. The ribs 134 are approximately 1 to 3 mm thick with the ribs 134 usually being approximately 2 mm thick. The plastic yield of the ribs 134 is approximately 60 to 80 MPa, and usually 73 MPa.

With reference again to the embodiment shown in FIGS. 5A-5C, the embodiments shown in FIGS. 5A-5C operate similar to the embodiment shown in FIGS. 4A-4B. Specifically, the second end 26 of the deflecting member 22 begins disposed a predetermined distance away from the main rail 16 while the vehicle 10 is in forward motion (see FIG. 5B). Upon the frontal collision event with the small offset barrier 128 such as a telephone pole, as shown in FIG. 5B, the bumper 33 deforms and moves the deflecting member 22 into the collision event position 30 where the second end 26 of the deflecting member 22 is in abutting contact with the main rail 16. Again, the deflecting member 22 absorbs and deflects energy from the frontal collision event imparted on the frame 14. The deflecting member 22 also acts as a ramp and deflects the vehicle 10 laterally during the collision event with the small offset barrier 128 to lessen vehicle intrusion by the small offset barrier 128.

Yet another aspect of the present invention is to address injuries resulting from real world crashes involving vehicles 10 into small off-set barriers 128 such as telephone poles. Tests of current vehicle structures revealed the need for improvement in order to adequately address small off-set impact situations. The present invention features a wedge shaped deflecting member 22 which acts as a ramp for deflecting the vehicle 10 laterally upon impact with the small off-set rigid barrier 128. The deflecting member 22 provides a uniform load distribution from the barrier 128 to the main rail 16 which allows less local rail deformation. The deflecting member 22 also provides vehicle lateral push which moves the vehicle 10 and the vehicle passenger away from the small off-set rigid barrier 128 and decreases intrusion into the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle frame assembly comprising:
   a front bumper;
   a main rail including a bracket; and
   a wedge-shaped deflecting member including:
      a first end operably coupled to the bracket; and
      a second end operable between a standard use position wherein the second end is spaced a predetermined distance from the main rail, and a collision event position wherein the second end rotates into abutting contact with the main rail under force relayed through the front bumper.

2. The vehicle frame assembly of claim 1, further comprising:
   a lateral rail, wherein the deflecting member is disposed between the front bumper, the lateral rail, and the main rail.

3. The vehicle frame assembly of claim 1, wherein the deflecting member includes a connecting flange disposed on the first end of the deflecting member and operably coupled to the main rail.

4. The vehicle frame assembly of claim 1, wherein the deflecting member moves from the standard use position to the collision event position independently of the main rail.

5. The vehicle frame assembly of claim 1, wherein the deflecting member includes a plurality of ribs.

6. The vehicle frame assembly of claim 1, further comprising:
   a plurality of bumps disposed on the main rail.

* * * * *